United States Patent [19]

Tuszko et al.

[11] Patent Number: 5,453,196
[45] Date of Patent: Sep. 26, 1995

[54] INDUCED LONG VORTEX CYCLONE SEPARATION METHOD AND APPARATUS

[76] Inventors: Wlodzimierz J. Tuszko, 5434 Camino De Ville, Camarillo, Calif. 93012; Wojciech J. Tuszko, 918 4th St. #2, Santa Monica, Calif. 90403

[21] Appl. No.: 89,700

[22] Filed: Jul. 9, 1993

[51] Int. Cl.⁶ .................................................. B01D 45/00
[52] U.S. Cl. ...................... 210/512.1; 55/459.1; 95/271; 209/715; 209/722
[58] Field of Search .................... 55/447, 459.1; 95/271; 209/715, 722; 210/512.1

[56] References Cited

U.S. PATENT DOCUMENTS

| | | | |
|---|---|---|---|
| 2,843,265 | 7/1958 | Rakowsky | 55/459.1 |
| 3,235,090 | 2/1966 | Bose et al. | 55/459.1 |
| 3,331,193 | 7/1967 | Woodruff | 55/459.1 |
| 3,501,014 | 3/1970 | Fitch, Jr. et al. | 55/459.1 |
| 4,927,298 | 5/1990 | Tuszko et al. | 406/173 |
| 5,071,542 | 12/1991 | Tuszko et al. | 55/459.1 |
| 5,269,949 | 12/1993 | Tuszko et al. | 210/788 |
| 5,273,647 | 12/1993 | Tuszko et al. | 210/221.2 |

FOREIGN PATENT DOCUMENTS 0264735  4/1988  European Pat. Off. .............. 55/459.1

*Primary Examiner*—C. Scott Bushey
*Attorney, Agent, or Firm*—Fulwider Patton Lee & Utecht

[57] ABSTRACT

The Induced Long Vortex Cyclone separation method and apparatus allows a three fold increase in residence time and therefore enhances the separation efficiency. The flow rate capacity is increased about 1.7 times for the same pressure drop and energy consumption compared to a conventional cyclone. The ILV cyclone could be used in addition for centrifugal separation of gases having a large difference between their molecular weights.

6 Claims, 1 Drawing Sheet

INDUCED LONG VORTEX CYCLONE SEPARATION METHOD AND APPARATUS

FIELD OF INVENTION

This invention relates to a method and apparatus centrifugally separating or collecting solid particles of foreign matter from a fluid. More specifically the invention is directed to improving separation efficiency of a cyclone dust collector, to increase its capacity, and to reduce investment and maintenance costs of such a cyclone dust collector.

BACKGROUND

An early cyclone method and apparatus is known from U.S. Pat No. 453,105 (Bretney), issued May 26, 1891, in which there are two stages, in line, in the separating cyclone. A frequent problem with this and later cyclone devices is that efficiency of separation is markedly decreased after either capacity or feed solids concentration are increased. Later cyclone designs eliminated the small in-line second stage cyclone, but introduced only slight construction changes, not changing, however, the general principle of cyclone operation and not eliminating those disadvantages.

A cyclone is a device that creates a vortex that does the work of separating the particulate matter from the fluid. In all present uses of the cyclone, this vortex is short, so that, the time when the particles are subjected to centrifugal separation forces, the so called residence time, is short also.

The advantages of creating a cyclone air core were discovered and afterwards used to greatly improve the cyclone collector (Wlodzimierz J. Tuszko et al. U.S. Pat. No. 4,927,298 issued May 22, 1990; U.S. Pat. No. 5,071,542 issued Dec. 10, 1991, U.S. Pat. No. 5,273,647, issued Dec. 28, 1993, filed Dec. 13, 1991. U.S. Pat. No. 5,269,949, issued Dec. 14, 1993.

It is therefore one object of the present invention to increase the residence time of a cyclone separator at least threefold.

A further object of the present invention is to increase the feed capacity of a conventional cyclone separator at least 1.7 times.

Another object of the present invention is to provide the same cyclone pressure drop and energy consumption as are typically provided in conventional cyclone separators.

Still another object of the invention is to provide an apparatus for centrifugal separations of fluids.

SUMMARY OF THE INVENTION

This invention relates to a device tier separation of particulate fluid suspensions known as a cyclone, in which centrifugal forces of the revolving particulate suspension cause separation of the suspensions into liner and coarser or lighter and denser fractions. There are two kinds of cyclones—pressure cyclones having a source of pressure such as a blower connected with a cyclone inlet pipe, and vacuum cyclones having a source of vacuum such as a blower connected with a cyclone overflow pipe. Separation efficiency of such conventional cyclones is considerably limited. Because of the small length of the vortex, hence, an residence time is short. The present inventions provides the induced long vortex (ILV) to increase residence time at least threefold. The induced long vortex can be made in a cyclone with an air core bed or without an air core bed.

DETAILED DESCRIPTION OF THE PREFERRED EMBODIMENT

Figures 1, 2:
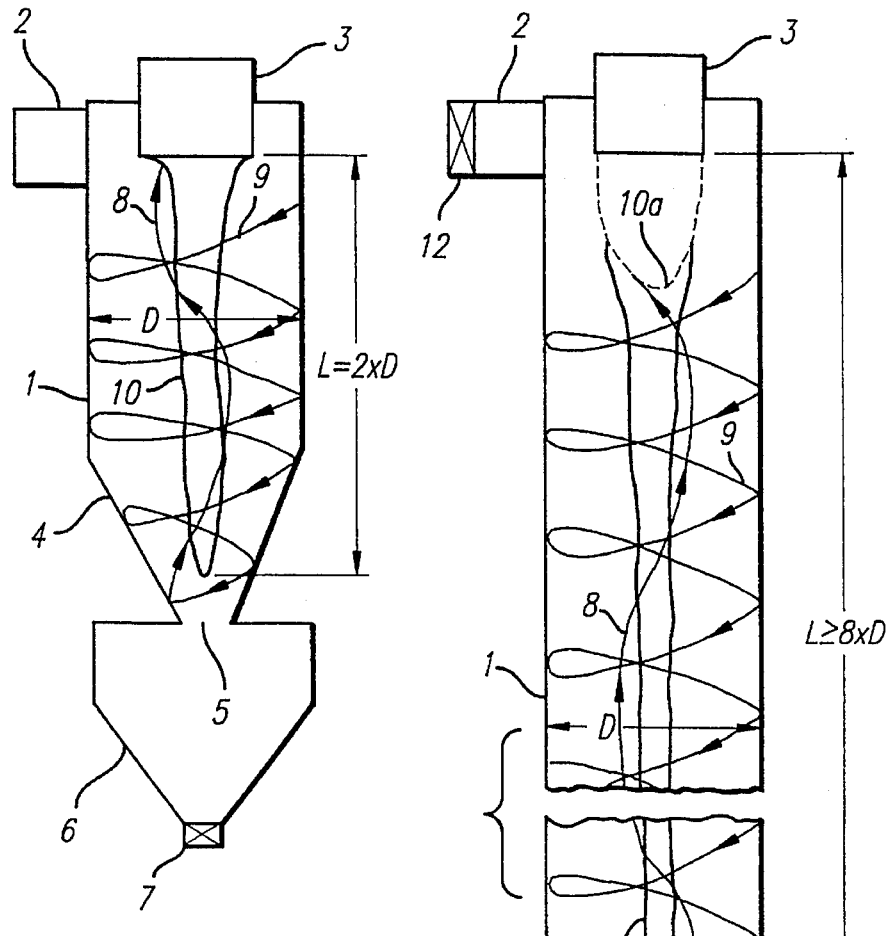
FIG. 1 is a cross-sectional elevational view of a prior art cyclone-hopper installation.
FIG. 2 is a cross-sectional elevational view of the induced long vortex cyclone-hopper installation.

A prior art cyclone-hopper installation is illustrated in FIG. 1. This cyclone is comprised of a cylindrical portion 1 having an inlet duct 2 for introduction of a feed suspension in a tangential direction. An exhaust or pipe 3 extends through the top or ceiling wall of the cylindrical portion. A frusto-conical portion 4 extends below the straight cylindrical portion 1. An outlet for separating heavier or coarser product at the bottom of the frusto-conical portion 4 is axially aligned with the overflow exhaust pipe 3. A hopper 6 extends below the outlet 5 of frusto-conical portion 4, and it is equipped with an anti-suction discharge valve 7. In such a cyclone, the length ($L_1$) of so called free vortex or free vortex air core 10, is equal to about 2 diameters (D) of the cyclone, such that $L_1=2D$. Separation efficiency is reduced because of a short residence time. Its capacity is reduced because this cyclone features a high flow resistance.

The induced long vortex cyclone method and apparatus of the invention for collecting solid particles from fluid or for separating gases is illustrated on FIG. 2. In the method of the invention, the cyclone works with long induced vortex air core $10b$, created in the long cyclone cylindrical portion 1. The length ($L_2$) of the long induced vortex air core equals about 8 or more cyclone diameters such that $L_2=8D$. To induce this long vortex air core, the three operational stages should be provided. In the first stage, the cyclone operates at an idle run, creating the short original vortex $10a$. In second stage, the negative pressure in lower cyclone-hopper 11 is increased by closing the valve 12 on the inlet duct 2 as fluid is sucked out from the lower cyclone hopper by a source of suction such as the auxiliary blower 13 through the pipes 14, 15 and the open valve 16. In the third stage after the long vortex air core was induced, the valve 12 is opened, the valve 16 is closed, and the source of suction 13 is stopped. After these three operational stages are made, the vortex air core extends from the exhaust pipe 3 to an air core bed 17, when used, or to the frusto-conical portion 4 when an air core bed is not used. At this moment the feed flow to the inlet duct should be opened and the cyclone will work up to the next shift break with stable, strong, and durable long induced vortex air core $10b$. When gases are separated, according to the method of the invention the source of suction 13 is operated continuously to remove heavier gas from hopper.

The 9" head diameter, industrial prototype of ILV cyclone was built and tested. The tests proved that when compared to a comparable conventional cyclone separator, the capacity of the ILV cyclone is about 1.7 times the capacity of a comparable conventional cyclone separator, with the same energy consumption and pressure drop. Particle emission in clean fluid produced by the ILV cyclones is further reduced because the residence time was increased about threefold. Centrifugal separation of gases having a large difference in molecular weights also was possible.

This invention is not to be limited by the embodiments shown in the drawings or described in the description, which is given by way of example and not limitation, but only in accordance with the scope of the appended claims.

I claim:

1. In a method for separating a first material from a second material from a feed fluid containing said first and second materials in a cyclone separator, said cyclone separator having walls forming an axially elongated cylindrical-conical separating chamber, said separating chamber having a cylindrical upper portion with a given diameter and a conical bottom portion, said bottom portion having a bottom outlet, said bottom outlet being connected to a hopper, said cylindrical upper portion having an exhaust pipe, and said cylindrical upper portion having an inlet duct, the method comprising introducing said feed fluid into said cylindrical portion in a tangential direction in a helical swirling flow pattern so as to establish within said upper cylindrical portion counterflowing inner and outer vortexes, causing lighter material in said feed fluid to move to the inner vortex and to exit through said exhaust pipe as overflow, and causing heavier material in said feed fluid to move to the outer vortex and to exit through the bottom outlet as underflow, the improvement in the method comprising the steps of:

operating the cyclone separator in a first idle run stage without introducing said feed fluid containing said first and second materials to be separated to create said inner and outer vortexes of an initial unextended length in said upper cylindrical portion;

withdrawing air from said hopper to create a vacuum in said hopper, so as to induce lengthening of said inner and outer vortexes until the length of said inner and outer vortexes in said upper cylindrical portion is at least eight times the diameter of said upper cylindrical portion;

ceasing withdrawal of air from said hopper and the creation of a vacuum in said hopper prior to introduction of said feed fluid containing said first and second materials to be separated into said upper cylindrical portion.

2. The method of claim 1, wherein said first and second materials to be separated comprises a lighter gas and a heavier gas, respectively.

3. The method of claim 2, wherein said feed fluid is introduced into said upper cylindrical portion, and further comprising the step of continuously withdrawing said heavier gas from said hopper.

4. The method of claim 1, further comprising operating said cyclone separator with an air core bed.

5. A cyclone separator apparatus for separating a first material from a second material from a feed fluid containing said first and second materials, comprising:

an upper cylindrical portion having a given diameter and a length at least eight times said diameter, said upper cylindrical portion having an overflow exhaust pipe and an inlet duct for introducing said feed fluid into said upper cylindrical portion in a tangential direction to create inner and outer vortexes having an initial unextended length;

a lower conical portion having a hopper portion and a bottom outlet connected to said hopper portion for an underflow product stream through an underflow exhaust; and means connected in fluid communication with said hopper portion for withdrawing air from said hopper portion to create a vacuum in said hopper portion to induce a lengthening of said inner and outer vortexes such that the length of said inner and outer vortexes is at least eight times the diameter of said upper cylindrical portion.

6. The cyclone separator apparatus of claim 5, further comprising valve means for closing off fluid communication between said hopper portion and said means for withdrawing air from said hopper portion.

* * * * *

UNITED STATES PATENT AND TRADEMARK OFFICE
CERTIFICATE OF CORRECTION

PATENT NO. : 5,453,196
DATED : September 26, 1995
INVENTOR(S) : Wlodrimierz J. Tuszko, Wojciech J. Tuszko It is certified that error appears in the above-identified patent and that said Letters Patent is hereby corrected as shown below:

Column 1, line 63, after "length of the vortex" delete "hence"

Column 2, line 54, change " The 9" head . . ." to --A 9" head . . .--.

Signed and Sealed this

Nineteenth Day of March, 1996

Attest:

BRUCE LEHMAN

Attesting Officer        Commissioner of Patents and Trademarks